Oct. 17, 1939.   K. CLARK   2,176,209
TRANSMISSION
Filed July 6, 1937   2 Sheets-Sheet 1
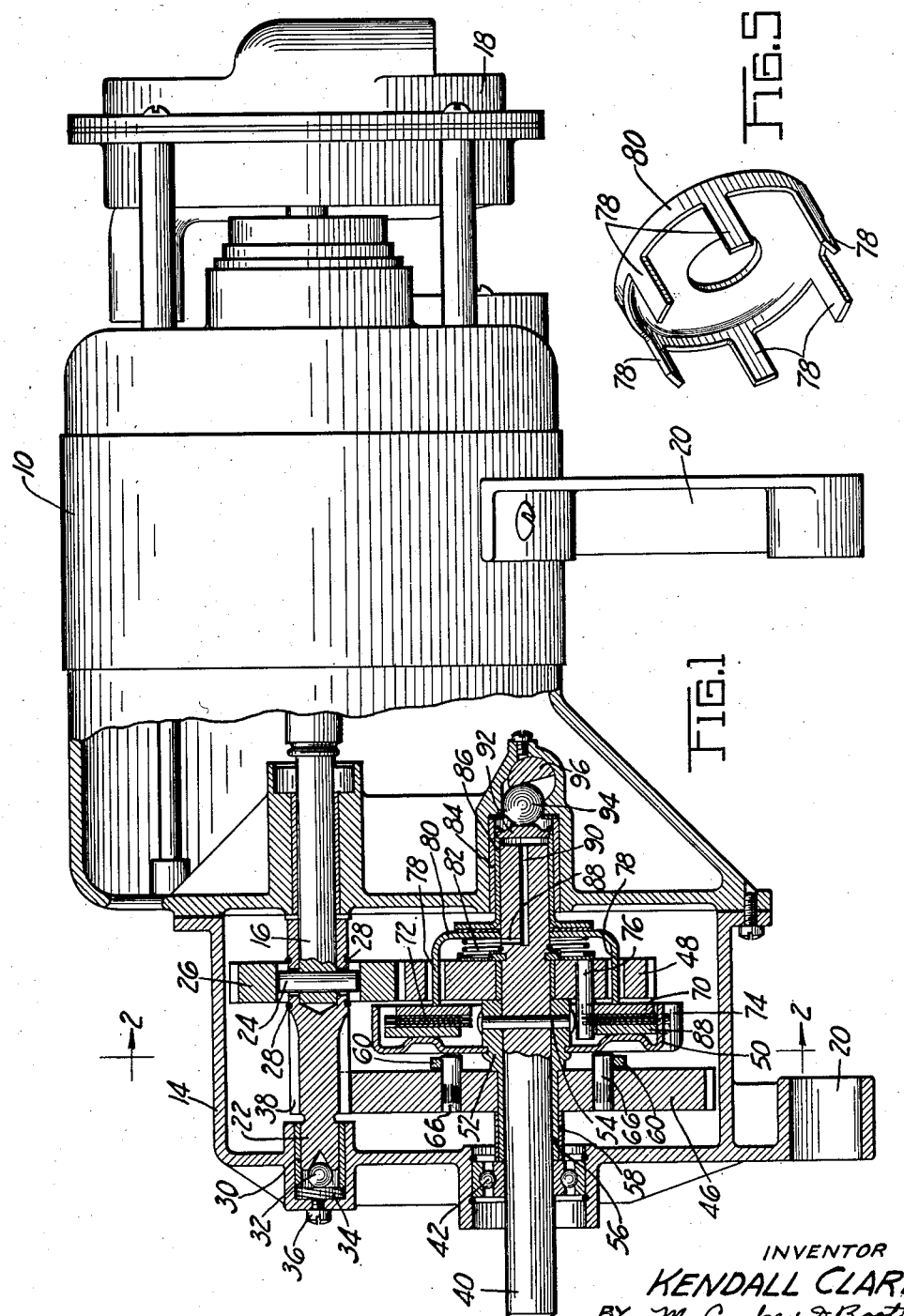
INVENTOR
KENDALL CLARK
BY McConkey & Booth
ATTORNEYS.

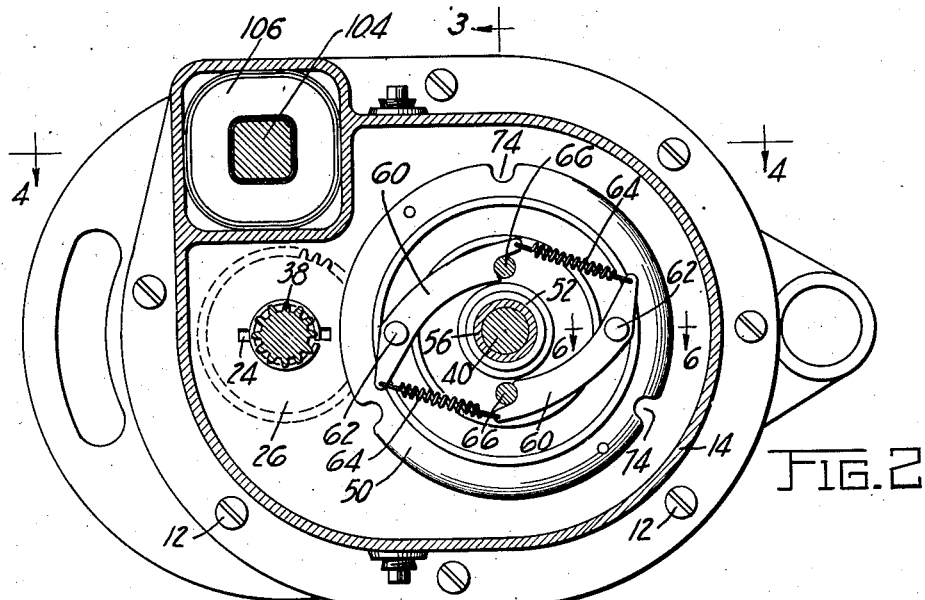
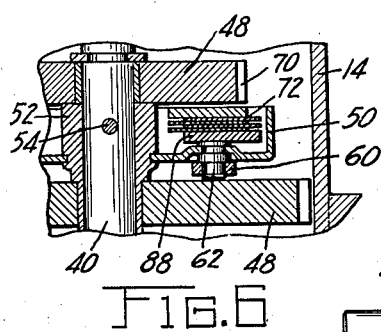
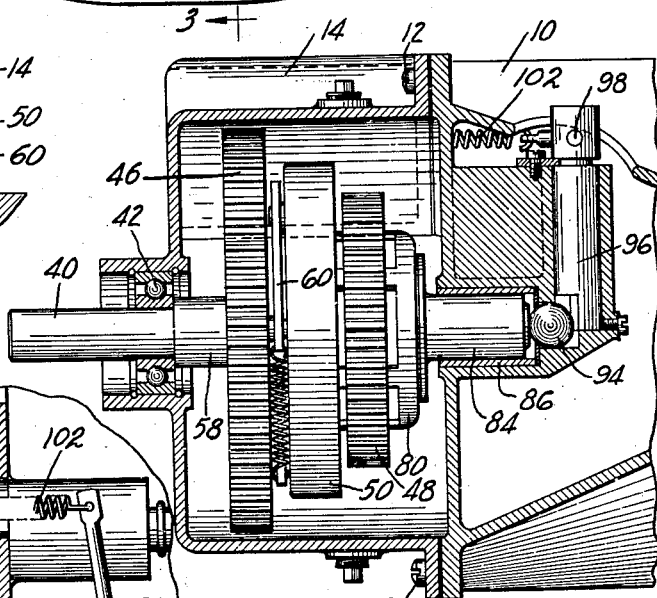
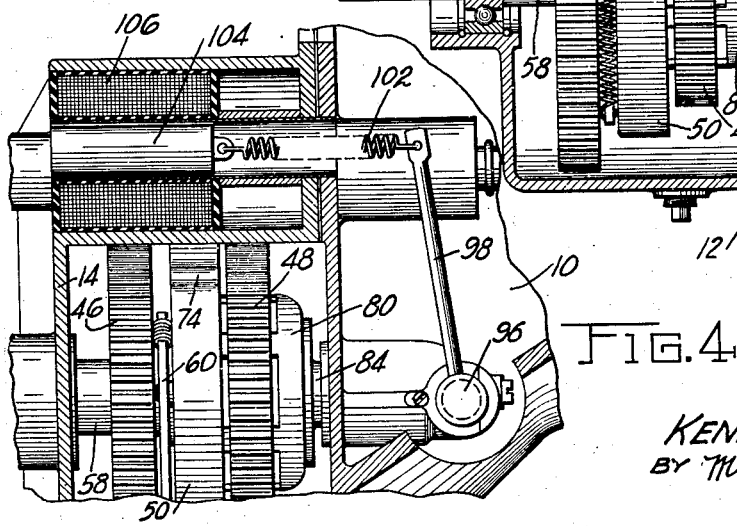

Patented Oct. 17, 1939

2,176,209

UNITED STATES PATENT OFFICE 2,176,209

TRANSMISSION

Kendall Clark, South Bend, Ind., assignor to Bendix Home Appliances, Inc., Detroit, Mich., a corporation of Delaware Application July 6, 1937, Serial No. 152,058

12 Claims. (Cl. 74—368)

This invention relates to transmissions, and is illustrated as embodied in a motor-driven transmission for driving a washing machine or the like automatically at either of two speeds.

An object of the invention is to provide a compact arrangement, and to secure reliable operation, in a rugged transmission adapted for manufacture on a large scale by mass production methods. Particularly it is an important object to reduce the number of parts of the transmission by taking advantage of a novel arrangement of the gears and the clutch means which controls their operation.

These and other objects of the invention, and various novel features of construction and arrangement, will be apparent from the following description of the illustrative embodiment shown in the accompanying drawings, in which:

Figure 1 is a plan view of a motor-transmission power unit embodying my invention, with the transmission broken away in horizontal section;

Figure 2 is a vertical section through the transmission, on the line 2—2 of Figure 1;

Figure 3 is a section through the transmission, on the line 3—3 of Figure 2;

Figure 4 is a partial section through the transmission, on the line 4—4 of Figure 2;

Figure 5 is a perspective view of one of the clutch-operating members; and

Figure 6 is a partial section, on the line 6—6 of Figure 1, showing the mounting of one of the pawls of a one-way drive connection.

The invention is shown embodied in a drive unit for the automatic washing machine described in application No. 129,429, filed March 6, 1937, by Rex Earl Bassett, Jr., and John W. Chamberlin. It comprises in general an electric motor 10, at one end of the housing of which is secured by suitable fastenings 12 a transmission housing 14, into which projects one end of the armature shaft 16 of the motor.

The other end of the armature shaft drives a water pump 18, and the motor and transmission housings are provided with brackets 20 for pivotally mounting the unit. These features form no part of the present invention, being covered in the above-identified Bassett and Chamberlin application and in application No. 136,359, filed April 12, 1937, by myself jointly with John W. Chamberlin.

A second shaft 22, coaxially alined with the armature shaft 16, is formed in one end with a recess which telescopes over the end of the shaft 16, the telescoped portions being secured together by a transverse pin 24 which projects radially into grooves in a gear 26 to key the gear on the recessed portion of the shaft 22. Means such as snap-rings 28 prevent axial movement of the gear 26.

The unrecessed end of the shaft 22 is provided with a bearing 30 carried by the wall of housing 14, and engages a thrust bearing ball 32 backed up by a disk 34 adjustably held by a setscrew 36. On this side of the gear 26, the shaft 22 is formed with pinion teeth 38, in effect providing a second gear of much smaller diameter than the gear 26.

Paralleling and at one side of the shafts 16 and 22 is a driven counter-shaft 40 provided at one end with a bearing described below and carried by the end of the motor housing, and projecting at its other end through a ball bearing 42 carried by the housing 14. The projecting end of the shaft 40 is provided with means (not shown herein) for driving the washing machine described in the above-identified Bassett and Chamberlin application.

The counter-shaft 40 is provided with a large gear 46 meshing with and continuously driven by the pinion teeth 38, and with a small gear 48 meshing with and continuously driven by the gear 26. Both of these gears are loose on the counter-shaft.

Between the gears 46 and 48 there is fixed on the counter-shaft 40 a cup-shaped clutch member 50, shown as riveted to a hub 52 fixed to shaft 40 by means such as a pin 54.

The hub 52 may have an integral spacer sleeve 56 engaging the bearing 42 and serving as a bearing for the gear 46, and a spacer sleeve 58 may be inserted between the gear 46 and the bearing 42.

A novel one-way drive is provided between the gear 46 and the clutch member 50, so that the gear 46 can drive the shaft 40 forward in low-speed drive, whereas at high speed the shaft 40 can over-run the gear 46. In the arrangement illustrated, pawls 60 are mounted on pivots 62 projecting from one side of the clutch member 50, and are formed with shoulders normally held by springs 64 in engagement with parts such as drive pins 66 projecting laterally from the adjacent face of the gear 46.

Within the clutch member 50 are arranged end clutch plates 68 and 70 and clutch disks 72. The member 50 has a number of depressions 74 in its periphery, forming keys seated in corresponding notches in the outer margins of alternate ones of the clutch plates and disks. The clutch plates and disks not thus keyed to the member 50 are notched to engage and be keyed to pins 76 projecting laterally from the gear 48.

The gear 48 is formed with an annular series of openings, through which pass presser members or fingers 78, shown as integral extensions of a stamped cup-shaped clutch operating member 80 on the motor side of the gear 48. A spring 82 surrounding the shaft 40, and compressed between gear 48 and member 80, normally holds the clutch disengaged.

The clutch-operating member 80 is engaged by a flange on the end of a sleeve 86, seated on and forming a bearing for and movable axially of the motor end of the shaft 40, and which is rotatably journaled in a bearing 84 carried by the end wall of the motor housing. The shaft 40 may have communicating drilled passages 88 and 90 to permit the transmission lubricant to reach the engaging surfaces of the sleeve 86 and the shaft 40.

The end of the sleeve 86 is provided with a thrust disk 92 engaged by an anti-friction thrust ball 94 engaged by a flat cam surface formed on a rock shaft 96. The shaft 96 is shown operated by a rock arm 98 connected by means such as a tension coil spring 102 to the core 104 of a solenoid 106.

In operation, when the solenoid 106 is de-energized, the drive is at low speed, the gear 48 turning freely relatively to the shaft 40 (the clutch 68—70—72 being disengaged), and the gear 46 driving the pins 66 counter-clockwise in Figure 2 to drive the pawls 60 and the member 50 on which the pawls are mounted. As the member 50 is carried by the hub 52 pinned to the shaft 40, this drives that shaft at low speed.

When the solenoid 106 is energized, the drive is at high speed, the cam surface on the rock shaft 96 forcing the clutch-operating member 80 to the left in Figure 1 to cause engagement of the clutch 68—70—72. This clutches the gear 48 to the shaft 40, while the shaft 40 over-runs the gear 46, the pawls 60 turning counter-clockwise in Figure 2 relatively to the driving pins 66 and snapping yieldingly over those pins each time they overtake them.

While one illustrative embodiment has been described in detail, it is not my intention to limit the scope of the invention to that particular embodiment, or otherwise than by the terms of the appended claims.

I claim:

1. A transmission comprising a driven counter-shaft having large and small gears loosely mounted thereon and having a clutch member fixed thereto, said small gear having openings therethrough, a drive shaft having small and large diameter gear means for continuously driving both of said gears respectively, a one-way drive connection between said large gear and the clutch member, a friction clutch connection between the small gear and the clutch member, and means operable axially of the counter-shaft through said openings for controlling the engagement and disengagement of said friction clutch connection.

2. A transmission comprising a driven counter-shaft having large and small gears loosely mounted thereon and having a clutch member fixed thereto between said gears, one of said gears having openings therethrough a drive shaft having small and large diameter gear means for continuously driving both of said gears respectively, a one-way drive connection between said large gear and one side of the clutch member, a disk clutch between the small gear and the other side of the clutch member, and means operable axially of the counter-shaft through said openings for controlling the engagement and disengagement of said disk clutch.

3. A transmission comprising a driven counter-shaft having large and small gears loosely mounted thereon and having a clutch member fixed thereto between said gears, a drive shaft having small and large diameter gear means for continuously driving both of said gears respectively, a one-way drive connection between said large gear and one side of the clutch member, a disk clutch between the small gear and the other side of the clutch member, and means including a member movable axially of the countershaft and arranged on the side of the small gear opposite said clutch and acting through openings in the small gear for controlling the engagement and disengagement of said disk clutch.

4. A transmission comprising a driven counter-shaft having large and small gears loosely mounted thereon and having a clutch member fixed thereto between said gears, a drive shaft having small and large diameter gear means for continuously driving both of said gears respectively, a one-way drive connection between said large gear and one side of the clutch member, an axially engageable and disengageable clutch between the small gear and the other side of the clutch member, a sleeve forming a bearing for the end of the counter-shaft and which is movable axially of the counter-shaft and which has operatively associated therewith means having fingers extending through openings in said small gear to control said clutch, and means for shifting said sleeve axially to operate said clutch.

5. A transmission comprising a driven counter-shaft having large and small gears loosely mounted thereon and having a clutch member fixed thereto between said gears, a drive shaft having small and large diameter gear means for continuously driving both of said gears respectively, a one-way drive connection between said large gear and one side of the clutch member, an axially engageable and disengageable clutch between the small gear and the other side of the clutch member, a sleeve forming a bearing for the end of the counter-shaft and which is movable axially of the counter-shaft and which has operatively associated therewith means having fingers extending through openings in said small gear to control said clutch, and a cam device at the end of the counter-shaft and acting on the end of said sleeve for shifting the sleeve axially to operate said clutch.

6. A transmission comprising a driven counter-shaft having large and small gears loosely mounted thereon and having a clutch member fixed thereto between said gears, a drive shaft having small and large diameter gear means for continuously driving both of said gears respectively, a one-way drive connection between said large gear and one side of the clutch member, an axially engageable and disengageable clutch between the small gear and the other side of the clutch member, a sleeve mounted on and which is movable axially of the counter-shaft and which has operatively associated therewith means acting through one of said gears for operating said clutch, and a cam device at the end of the counter-shaft and acting on the end of said sleeve for shifting the sleeve to operate said clutch.

7. A transmission comprising a counter-shaft having a large gear member loosely mounted thereon and a clutch member fixed thereon beside said gear member, spring-pressed pawls mounted on the side of one of said members, parts projecting from the side of the other member into the path of said pawls, whereby the gear member has a one-way drive connection with said counter-shaft through said clutch member, a small gear member mounted on said counter-shaft on the opposite side of the clutch member from the large gear member and an engageable and disengageable clutch between the clutch member and the small gear member, means for controlling the clutch from outside the transmission, and small and large diameter gear devices for driving respectively the large and small gear members.

8. A transmission comprising a counter-shaft having a large gear member loosely mounted thereon and a clutch member fixed thereon beside said gear member, spring-pressed pawls pivoted on the side of one of said members, pins projecting from the side of the other member into the path of said pawls, whereby the gear member has a one-way drive connection with said counter-shaft through said clutch member, a small gear member, an engageable and disengageable clutch for controllably connecting the clutch member and the small gear member, means for controlling the clutch from outside the transmission, and small and large diameter gear devices for driving respectively the large and small gear members.

9. A motor having its armature shaft projecting at one end, a transmission housing secured to one end of the motor and into which the armature shaft projects, a shaft having one end recessed and telescoping over the end of the armature shaft and having at its other end a bearing in the side wall of said housing, a pin extending transversely through the telescoped ends of said shafts, a gear mounted on the recessed part of the second shaft and keyed thereto by the ends of said pin, one of said shafts being provided with pinion teeth at one side of said gear, a counter-shaft having large and small gears meshing respectively with said pinion teeth and with said first gear, and means for alternatively drivably connecting either the large or the small gear to the counter-shaft.

10. A motor having its armature shaft projecting at one end, a transmission housing secured to one end of the motor and into which the armature shaft projects, a shaft having one end recessed and telescoping over the end of the armature shaft and having at its other end a bearing in the side wall of said housing and provided adjacent said other end with pinion teeth, a pin extending transversely through the telescoped ends of said shafts, a gear mounted on the recessed part of the second shaft and keyed thereto by the ends of said pin, a counter-shaft having large and small gears meshing respectively with said pinion teeth and with said first gear, and means for alternatively drivably connecting either the large or the small gear to the counter-shaft.

11. A motor having its armature shaft projecting at one end, a transmission housing secured to one end of the motor and into which the armature shaft projects, a shaft having one end recessed and telescoping over the end of the armature shaft and having at its other end a bearing in the side wall of said housing, a pin extending transversely through the telescoped ends of said shafts, a gear mounted on the recessed part of the second shaft and keyed thereto by the ends of said pin, one of said shafts being provided with pinion teeth at one side of said gear, a counter-shaft having large and small gears meshing respectively with said pinion teeth and with said first gear, and means mounted on the counter-shaft between said large and small gears for alternatively drivably connecting either the large or the small gear to the counter-shaft.

12. A motor having its armature shaft projecting at one end, a transmission housing secured to one end of the motor and into which the armature shaft projects, a shaft having one end recessed and telescoping over the end of the armature shaft and having at its other end a bearing in the side wall of said housing and provided adjacent said other end with pinion teeth, a pin extending transversely through the telescoped ends of said shafts, a gear mounted on the recessed part of the second shaft and keyed thereto by the ends of said pin, a counter-shaft having large and small gears meshing respectively with said pinion teeth and with said first gear, and means mounted on the counter-shaft between said large and small gears for alternatively drivably connecting either the large or the small gear to the counter-shaft.

KENDALL CLARK.